Figure 1:
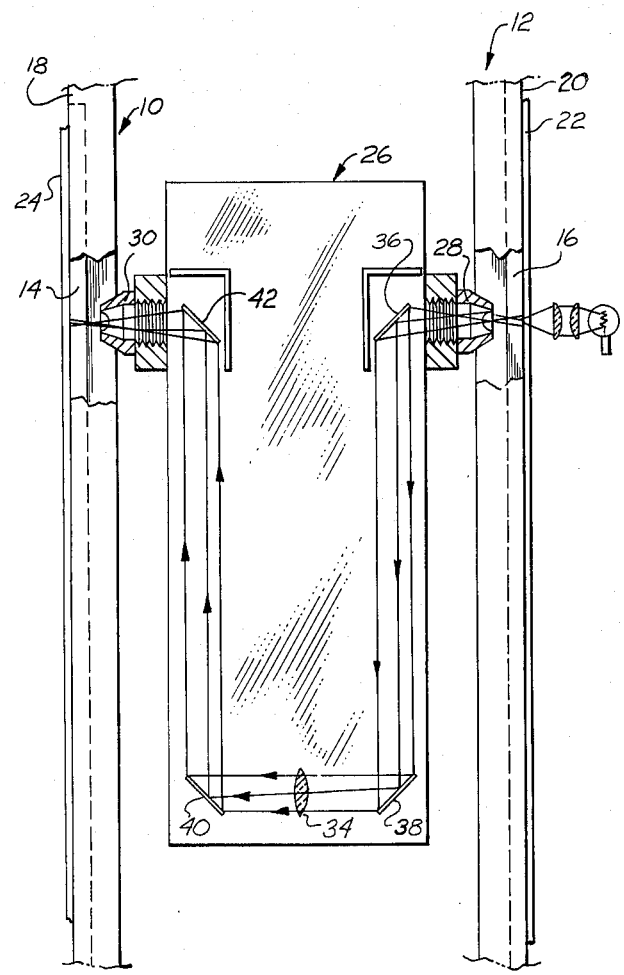

INVENTOR.
SARKIS K. TCHEJEYAN and
ROBERT E. JONES
BY
Bean, Brooks, Buckley & Bean
ATTORNEYS

United States Patent Office 3,260,154
Patented July 12, 1966

3,260,154
OBJECTIVE MOUNTING MEANS FOR PROJECTION PRINTERS
Sarkis K. Tchejeyan and Robert E. Jones, Jamestown, N.Y., assignors to Micro-Line Inc., Jamestown, N.Y.
Filed May 22, 1963, Ser. No. 282,509
5 Claims. (Cl. 88—24)

This invention relates to an apparatus for the production of precision photographic copies of master negatives or diapositives, and is particularly directed to the manufacture of precise scales, rulings and the like by projection printing.

For many practical applications, it is desirable to provide a measuring scale having a high degree of accuracy over a relatively great length. For example, it would be highly desirable to provide reproducible measuring scales of 6–24 inch lengths or longer, in which the scales are capable of being read to $1/10,000$ of an inch and with no more than a few millionths of an inch error in the scales over any given 12 inch span. As a minimum, such a scale would require one thousand lines per inch in which, for ease of reading either directly or in conjunction with a vernier scale, the individual lines would be a width or thickness in the order of $1/10,000$ of an inch. To render such reproduction economically feasible, while achieving the requisite accuracy, the use of a photographic process is indicated since such a process inherently possesses high integrity, reliability and simplicity.

Photographic printing of scales may be achieved either by contact printing or by projection printing techniques. In the former method, the original is held in close contact with the film or plate on which the copy is to be made. A small, distant source of light or a collimated beam of light passing through the original is used to make the exposure on the plate. Although this method permits fairly long scales to be printed, inaccuracies caused by defraction effects and by shadowing of microscopic inhomogeneities are difficult to overcome. With the projection printing method, on the other hand, it is difficult to produce closely ruled, highly accurate scales of great length. Ordinary optical projection printing in which the full length of scale would be exposed simultaneously is not feasible for the reason that optical systems capable of combining the necessary high resolution with a complete absence of distortion over a field size encompassing the length of the scale (24 inches or greater) are extremely difficult to compute and to construct. To overcome this difficulty, an alternative arrangement for optical projection printing is one in which various portions of the material being produced are exposed in sequence, or serially. A variety of such techniques are known and used in document copying and in motion picture film printing, and although these techniques are entirely adequate for their intended purpose, they do not possess the accuracy or stability necessary for the purpose set forth herein.

According to one method for making precise scales, rulings and the like by projection printing, a photographic original and a print-receiving member are maintained in immovable parallelism and an optical projection system is caused to focus an image on the original and print-receiving member respectively while substantially uniform motion between the members and the optical system is effected in a direction parallel to the photographic original and the print-receiving member. To accomplish this result, a preferred method may employ spaced ways or rails for supporting the photographic original and the print-receiving member and which ways or rails are also used as guide means for supporting the optical system. However, seemingly inevitable variations in the ways or rails, even when such are machined in accord with the most advanced prior art techniques, will create deviations in the aforesaid motion from a truly straight path, adversely affecting extremely fine resolution and accuracy. It is, therefore, of primary concern in connection with the present invention to provide an improved mounting and guiding arrangement for the aforesaid optical system which will minimize errors, deviations or the like stemming from inaccuracies in the ways or rails or such a printing system.

Figure 2:
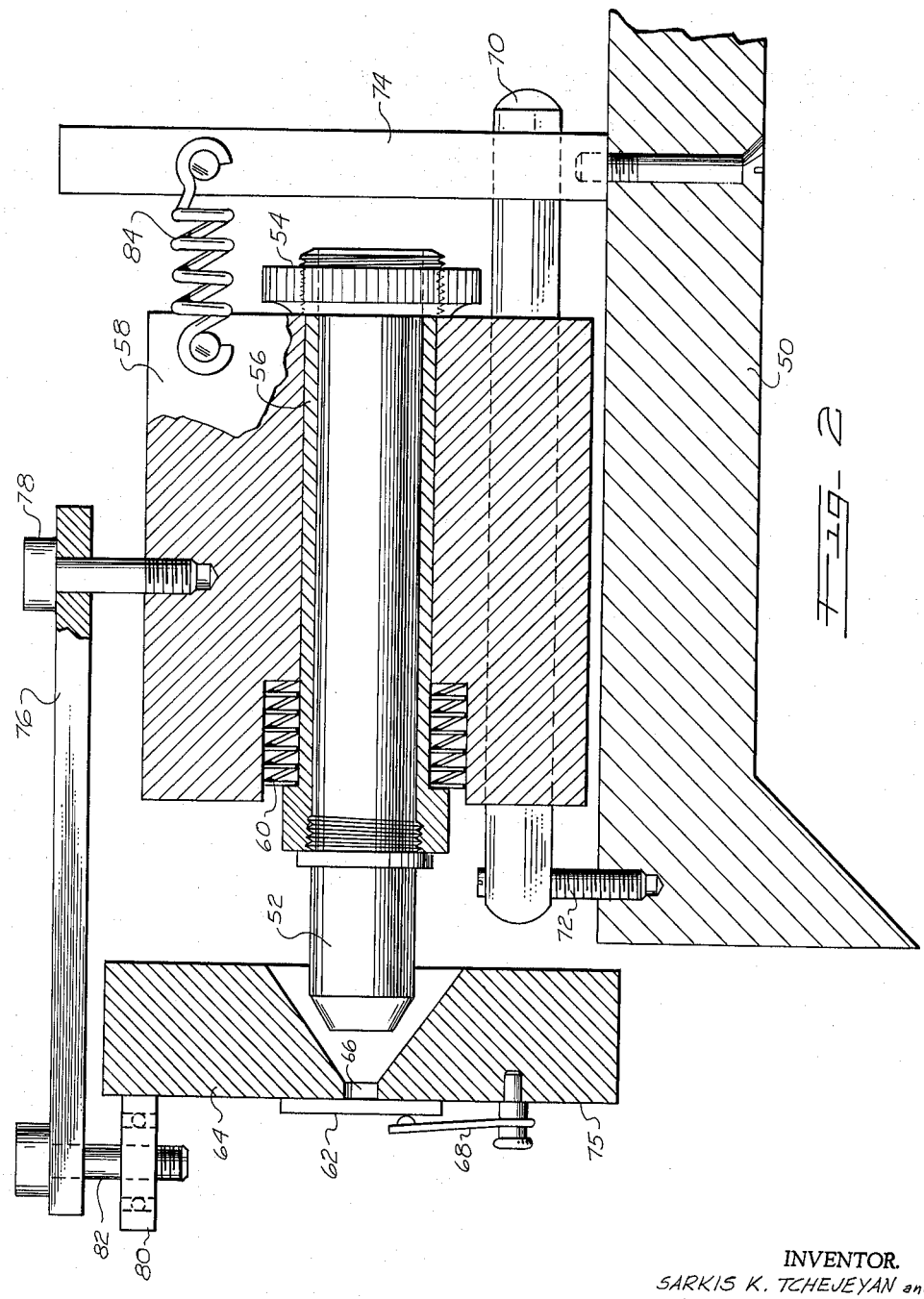

Other objects and advantages of the invention will appear from the description hereinbelow and the accompanying drawing wherein:

FIG. 1 is a plan view, partly broken away, illustrating the principles of the projection printing techniques, but not illustrating the improvement according to the present invention; and FIG. 2 is a vertical section taken through a portion of the optical mounting assembly, illustrating the principles of the present invention.

With reference at this time more particularly to FIG. 1, reference characters 10 and 12 indicate accurately machined platens which are provided with mounting means (not shown) maintaining the same in accurately aligned parallel relationship. The platens are provided with longitudinally extending slits or slots 14 and 16 and in covering relationship to these slots, mounted on the outer faces 18 and 20 of the platens are the photographic original or negative 22 and the print-receiving member or film 24 respectively.

An optical system indicated generally by the reference character 26 is supported on the carriage of a lathe or the like so that movement may be imparted to the optical system 26 so that it moves parallel with the platens. Preferably, the optical system comprises a pair of identical objectives 28 and 30 and an intermediate field lens 34. Deviating prisms 36, 38, 40 and 42 are used to cause the optical path to be deviated as shown. Optically, the system is a one-to-one system such that when the objective 28 is focused upon the negative 22, and the objective 30 is focused to image on the film 24, an erect, real image of the photographic original will be produced on the surface of the film member 24. It is to be noted that the optical system has three conjugate planes; one at the negative, one at the film and one intermediate conjugate plane and that the optical system is symmetrical so that the aforesaid erect, real image will be formed on the light sensitive surface of the film which is an exact copy of the original, permitting the film and negative to be interdependently mounted in fixed and immovable relation to each other. Thus, no errors can arise as a result of relative movement between film and negative.

Because the objectives 28 and 30 are of relatively high power, it will be appreciated that the problem of maintaining the objectives 28 or 30 focused relative to the respective members 22 and 24 presents a real problem inasmuch as slight lateral movement of the optical system 26 in its movement along the ways or rails can be expected even though the rails are carefully and accurately machined.

In FIG. 2, the optical system of a continuous printing machine is shown mounted on the carriage 50 of a lathe, such carriage, as is conventional, being mounted on ways or rails (not shown) for substantially straight line movement therealong. The objective 52 is brought to its best focus by means of the focusing knob 54 which is threadedly mounted on the end of the microscope tube 56 slidably mounted in the block 58 and which microscope tube carries the objective 52. The tube 56 slides parallel to the optical axis of the objective 52 and a compression spring 60 normally urges the microscope tube forwardly to engage the focusing knob 54 against the side wall of the block 58, substantially as is shown.

By means of the above mechanism, the microscope objective 52 is brought to its best focus on the surface of the photographic plate 62 which is mounted on the surface of the platen 64 in covering relationship to the slot 66 therein. Suitable mounting means such as the clamp 68 is provided for holding the photographic plate against the platen 64.

The block 58 carrying the optical system slides freely on a smoothly ground rod 70 which is adjustably mounted on the carriage 50 by means of support members 72 and 74. By properly adjusting the support means 72, the optical axis of the objective 52 is brought into perpendicularity with the outer surface 75 of the platen 64. A spacer rod 76 is pivotally mounted to the block 58 by means of the hinge pin 78 and the outer end of this rod or arm 76 carries a roller bearing member 80 on the depending pin element 82, substantially as shown. Through the action of a tension spring 84 which serves to urge the block 58 to the right in FIG. 2, the roller ball bearing 80 will be maintained in contact with the surface 75 of the platen 64 and, therefore, as the carriage 50 moves along the lathe bed or equivalent means, the spring 84 will maintain the roller bearing 80 in contact with the surface 75 of the platen 64 so that the distance between the microscope objective 30 and the member 62 will be maintained constant despite slight lateral shifting or irregularities of motion imparted to the member 50 by the supporting mechanism therefor. The objective 52 is positioned at its best focus by the knob 54 and will be maintained at this position of best focus during the operation of the machine subsequent to such adjustment.

From the above, it is obvious that by virtue of the mechanisms and control shown and described, the focus of the objective will not be altered due to irregularities of the lathe bed or other supporting mechanism.

It is to be understood that certain changes and modifications as illustrated and described may be made without departing from the spirit of the invention or the scope of the following claims.

1. A photographic projection printer comprising, in combination,
   an original having an elongate scale thereon,
   an elongate print-receiving member having a light sensitive surface,
   support means for holding said original and said print-receiving member in spaced, parallel and fixed relation to each other,
   an optical projection system having three conjugate planes, one at said scale, one at said light sensitive surface, and a third midway between the first two,
   means for imparting substantially uniform relative motion between said support means and said optical system in a direction along the length of said scale,
   said optical system including a pair of microscope objectives, one focused on said scale and the other focused on said light sensitive surface,
   and means movably mounting said objectives along paths perpendicular to the path of relative movement between said optical system and said support means and including means for moving said objectives along their respective paths perpendicular to the path of relative movement between said optical system and said support means in response to relative movement between the optical system and the support means to maintain said objectives in fixed spaced relation to the support means.

2. A photographic projection printer comprising, in combination,
   an original having an elongate scale thereon,
   an elongate print-receiving member having a light sensitive surface,
   support means for holding said original and said print-receiving member in spaced, parallel and fixed relation to each other,
   an optical projection system having three conjugate planes, one at said scale, one at said light sensitive surface, and a third midway between the first two,
   means for imparting substantially uniform relative motion between said support means and said optical system in a direction along the length of said scale,
   said optical system including a mounting base and a pair of microscope objectives mounted on said base for movements perpendicular to the path of relative movement between said optical system and said support means,
   and means engaging said support means and connected to said microscope objectives to cause the latter to remain in fixed spaced relation to the support means as the optical system and the support means are relatively moved.

3. A photographic projection printer comprising, in combination,
   an original having an elongate scale thereon,
   an elongate print-receiving member having a light sensitive surface,
   support means for holding said original and said print-receiving member in spaced, parallel and fixed relation to each other,
   an optical projection system having three conjugate planes, one of said scale, one at said light sensitive surface, and a third midway between the first two,
   means for imparting substantially uniform relative motion between said support means and said optical system in a direction along the length of said scale,
   said optical system including a base, a pair of mounting members slidably engaged upon said base for movements perpendicular to the path of relative movement between said optical system and said support means,
   and a microscope objective carried by each mounting member,
   said support means comprising a pair of platens having spaced, parallel support surfaces upon which said original and said print-receiving member are mounted,
   and follower means connected to each mounting member and engaged with said support surfaces of respective platens to maintain the objectives in fixed relation with respect to said support surfaces independent of lateral movements of said base.

4. The projection printer according to claim 3 wherein said follower means comprises an arm pivotally connected to each mounting member and carrying a roller engaged with a respective support surface,
   and spring means acting between each mounting member and said base for maintaining each roller engaged with its support surface.

5. The projection printer according to claim 4 wherein each objective is slidably spring urged within its mounting member toward a respective platen, and focusing knob means opposing the spring force to adjustably fix the position of each objective relative to its mounting member.

References Cited by the Examiner

German application, No. 1,061,531, printed July 1959.

NORTON ANSHER, *Primary Examiner.*

R. A. WINTERCORN, *Assistant Examiner.*